(12) United States Patent
Kuroda

(10) Patent No.: US 12,420,681 B2
(45) Date of Patent: Sep. 23, 2025

(54) SEAT SLIDING DEVICE

(71) Applicant: TF-METAL Co., Ltd., Shizuoka (JP)

(72) Inventor: Shunsuke Kuroda, Shizuoka (JP)

(73) Assignee: TF-METAL Co., Ltd., Shizuoka (JP)

( * ) Notice: Subject to any disclaimer, the term of this patent is extended or adjusted under 35 U.S.C. 154(b) by 166 days.

(21) Appl. No.: 18/368,134

(22) Filed: Sep. 14, 2023

(65) Prior Publication Data

US 2024/0100999 A1 Mar. 28, 2024

(30) Foreign Application Priority Data

Sep. 22, 2022 (JP) ................................. 2022-151532

(51) Int. Cl.
*B60N 2/00* (2006.01)
*B60N 2/07* (2006.01)
*B60N 2/08* (2006.01)

(52) U.S. Cl.
CPC ......... *B60N 2/0887* (2013.01); *B60N 2/0705* (2013.01); *B60N 2/074* (2013.01); *B60N 2/0818* (2013.01); *B60N 2/0875* (2013.01)

(58) Field of Classification Search
CPC .. B60N 2/0887; B60N 2/0705; B60N 2/0818; B60N 2/074; B60N 2/0875
See application file for complete search history.

(56) References Cited

U.S. PATENT DOCUMENTS

| 8,695,937 | B2 * | 4/2014 | Yamada | ............... | B60N 2/0727 |
| | | | | | 296/65.13 |
| 9,073,455 | B2 | 7/2015 | Hayashi | | |
| 2013/0206950 | A1 | 8/2013 | Hayashi | | |
| 2014/0239690 | A1 * | 8/2014 | Yamada | ................... | B60N 2/07 |
| | | | | | 297/344.1 |
| 2015/0048603 | A1 * | 2/2015 | Zaiki | ..................... | B60N 2/0722 |
| | | | | | 280/730.2 |
| 2015/0090853 | A1 * | 4/2015 | Arakawa | .............. | B60N 2/0875 |
| | | | | | 248/429 |
| 2015/0306981 | A1 * | 10/2015 | Arakawa | ................ | B60N 2/085 |
| | | | | | 248/429 |
| 2018/0079325 | A1 * | 3/2018 | Hayashi | ............... | B60N 2/0843 |

(Continued)

FOREIGN PATENT DOCUMENTS

| JP | 2001-219768 A | 8/2001 |
| JP | 2013-166434 A | 8/2013 |

*Primary Examiner* — Jonathan Liu
(74) *Attorney, Agent, or Firm* — Young Basile Hanlon & MacFarlane, P.C.

(57) ABSTRACT

A seat sliding device includes a lever member, a lock member, a rear biasing member, an operation member, and a front biasing member. A cylindrical portion of the operation member is inserted inside the lever member. At a front end of the front biasing member inserted into the cylindrical portion of the operation member, a retaining portion and a release portion are formed, the retaining portion preventing the operation member from moving forward, and the release portion extending forward from the retaining portion. A through-hole that penetrates into an interior of the cylindrical portion of the operation member is formed in an upper surface or a lower surface of a part that is forward of a part inserted into the lever member, of the cylindrical portion of the operation member at a position facing the release portion or at a position on a front side from the release portion.

8 Claims, 18 Drawing Sheets

(56) References Cited

U.S. PATENT DOCUMENTS

| | | | |
|---|---|---|---|
| 2020/0276919 A1* | 9/2020 | Kumagai | B60N 2/0881 |
| 2020/0406786 A1* | 12/2020 | Nishio | B60N 2/0715 |
| 2022/0266726 A1* | 8/2022 | Taniguchi | B60N 2/085 |
| 2022/0266727 A1* | 8/2022 | Taniguchi | B60N 2/0818 |

* cited by examiner

SEAT SLIDING DEVICE

CROSS-REFERENCE TO RELATED APPLICATION(S)

This application claims priority to and the benefit JP Patent Application Serial No. 2022-151532, filed Sep. 22, 2022, the entire disclosure of which is hereby incorporated by reference.

TECHNICAL FIELD

The present disclosure relates to a seat sliding device used for a vehicle seat.

BACKGROUND

In a seat sliding device for a vehicle, an upper rail fixed to a seat is provided to be slidably movable on a lower rail fixed to a vehicle body, and lock teeth (lock portions) of a lock member attached to the upper rail engage with lock grooves (locked portions) in the lower rail to lock the seat. The seat sliding device has a lever member for operating the lock portions in a lock release direction, and the front side part of the lever member from the turning center is biased upward by a biasing member. An operation member is connected to the front end of the lever member, and the lever member is configured to rotate with the operation member by lifting the operation member upward.

In JP 2013-166434 A, a lever member is turnably supported about an axis in the left-right direction with respect to an upper rail, and at a rear end of the lever member, lock portions are provided which are disengaged from lock grooves provided so as to be continuous in the longitudinal direction. The lock grooves are provided in a lower rail. In addition, an operation member is connected to the front end of the lever member, and the lever member is configured to turn upward integrally by lifting an operation handle upward. Between the operation member and the lever member, a biasing member is provided to prevent the movement of the operation member in the front-rear direction with respect to the lever member.

Meanwhile, J P 2001-219768 A discloses a structure in which an arrowhead provided at a front end of a lock plate (lever member) is inserted into the inside of a slide lever (operation member). In JP2001-219768 A, a cylindrical spring is provided between an inner surface of the operation member and the arrowhead of the lever member to retain the operation member.

SUMMARY

However, in JP 2013-166434 A, an operation range (an angle) for allowing the operation of the operation member is reduced because the biasing member is disposed below the operation member. Meanwhile, in JP 2001-219768 A, since the arrowhead is inserted into the interior of the operation member, two vertical walls are formed in an overlapped manner, and the increase in diameter of the operation member greatly affects the weight increase, and therefore the arrowhead is small and sufficient strength cannot be obtained. In addition, in JP 2001-219768 A, if the cross section is made quadrilateral to ensure the strength of the arrowhead, for example, the spring and the operation member are disposed outside thereof, the operation member and lever member become larger vertically, and accordingly the operation range (angle) for allowing the operation becomes small. In addition, in order to reduce the burden on the operator when attaching and detaching the operation member and shorten the operation time, it is desirable to facilitate the attachment and detachment of the operation member to and from the lever member, especially the removal of the operation member from the lever member.

Therefore, in the present invention, a biasing member is disposed so as not to affect operation ranges of an operation member and a lever member, and the shape of the biasing member is simplified, and the present invention aims to further facilitate the attachment and detachment of the operation member.

A seat sliding device according to the present invention includes: a lower rail extending in a front-rear direction of a vehicle; an upper rail that moves relative to the lower rail in a longitudinal direction; a lever member that is turnably supported about an axis in a left-right direction with respect to the upper rail; a lock member that is provided at a rear end of the lever member and includes a lock portion that can move between a lock position where the lock portion engages with a locked portion formed in the lower rail and a lock release position where the lock portion comes away from the locked portion; a rear biasing member that biases the lock portion in a lock position direction; and an operation member connected to a front end of the lever member. The lever member includes: a pair of left and right side walls extending in a longitudinal direction of the upper rail; an upper support portion that is provided at an upper end of a front end of at least one of the pair of left and right side walls and extends toward the other of the pair of left and right side walls in the left-right direction; and a lower support portion that is provided at a lower end of the front end of the at least one of the pair of left and right side walls and extends toward the other of the pair of left and right side walls in the left-right direction. The front end of the lever member is formed into a substantially square cross section by the pair of left and right side walls, the upper support portion, and the lower support portion, and a cylindrical portion of the operation member is inserted inside the front end of the lever member. A front biasing member is provided, which is formed of a bar-shaped member, and has a support portion engaged with an engaging portion provided in the upper rail and a front end inserted inside the cylindrical portion of the operation member. A retaining portion and a release portion are formed at the front end of the front biasing member, the retaining portion biasing the operation member upward and pressing the operation member against the upper support portion, and engaging with an inner protrusion provided at the operation member and preventing the operation member from moving forward, and the release portion extending forward from the retaining portion. A through-hole that penetrates into an interior of the cylindrical portion of the operation member is formed in an upper surface or a lower surface of a part that is forward of a part inserted into the lever member, of the cylindrical portion of the operation member at a position facing the release portion or at a position on a front side from the release portion.

According to the present invention, the biasing member can be disposed so as not to affect the operation ranges of the operation member and the lever member, the shape of the biasing member can be simplified, and moreover, the attachment and detachment of the operation member can be facilitated.

DETAILED DESCRIPTION

Embodiments of the present invention will be described below with reference to the drawings.

First Embodiment

Figure 1:
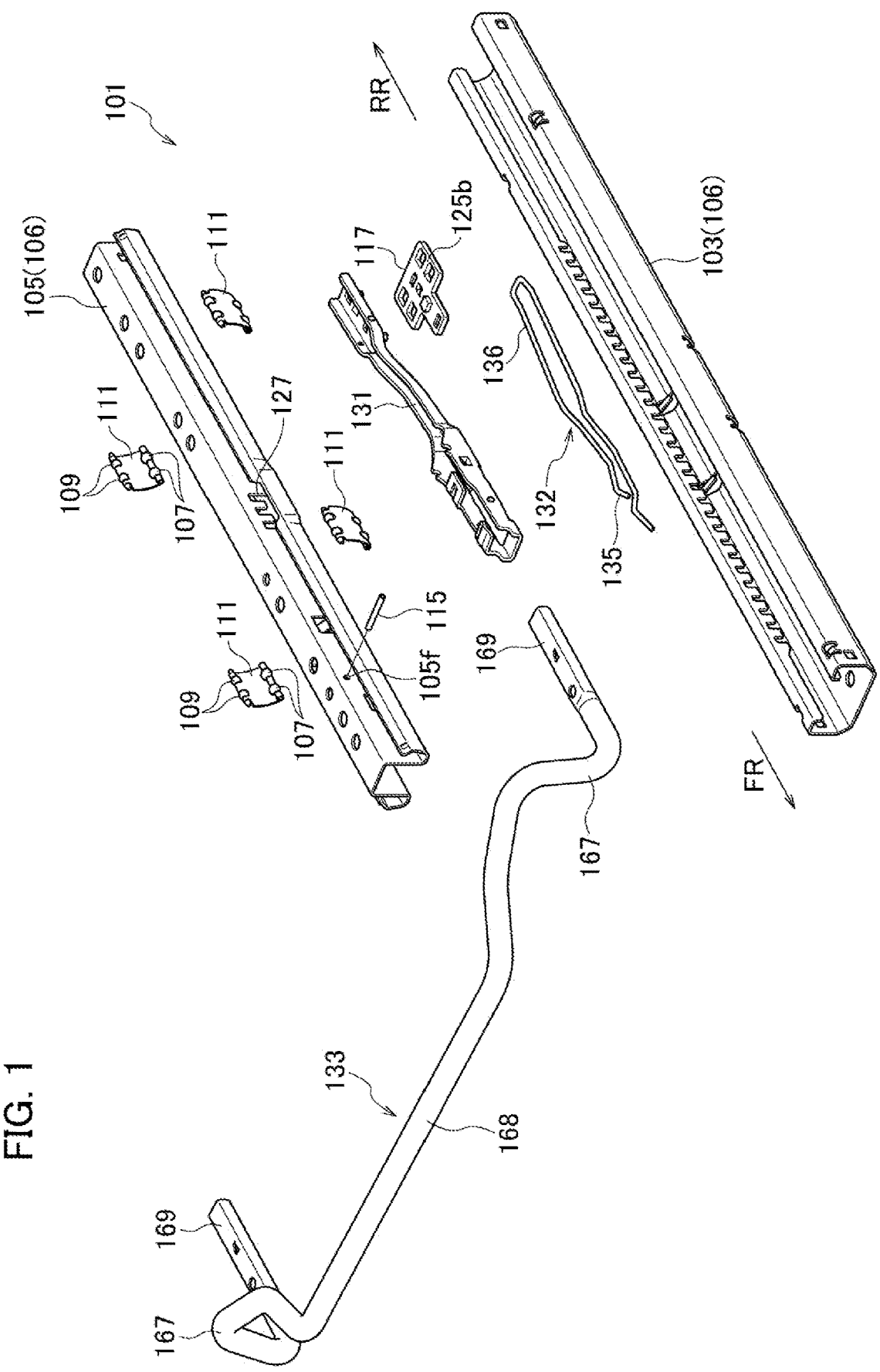
FIG. 1 is an exploded perspective view of a seat sliding device according to a first embodiment of the present invention.

A seat sliding device 101 according to a first embodiment of the present invention shown in FIG. 1 is a manual seat sliding device in which the position of a vehicle seat in a front-rear direction is adjusted manually. The seat sliding device 101 includes a lower rail 103 and an upper rail 105. The lower rail 103 is installed on a floor surface of a vehicle and extends in a vehicle front-rear direction. The upper rail 105 is installed on a back surface of a seating portion (not shown) of a seat and is assembled to be movable within the lower rail 103 in a relative manner in a longitudinal direction of the lower rail 103. The lower rail 103 and the upper rail 105 constitute a rail body 106, and a pair of left and right rail bodies 106 are provided. Note that, in the following description (including other embodiments), "front" is the vehicle front FR side which is the left side in FIG. 1, "rear" is the vehicle rear RR side which is the right side in FIG. 1, and "left-right" is the left-right direction when viewing the vehicle front side from the vehicle rear side.

Figure 2:
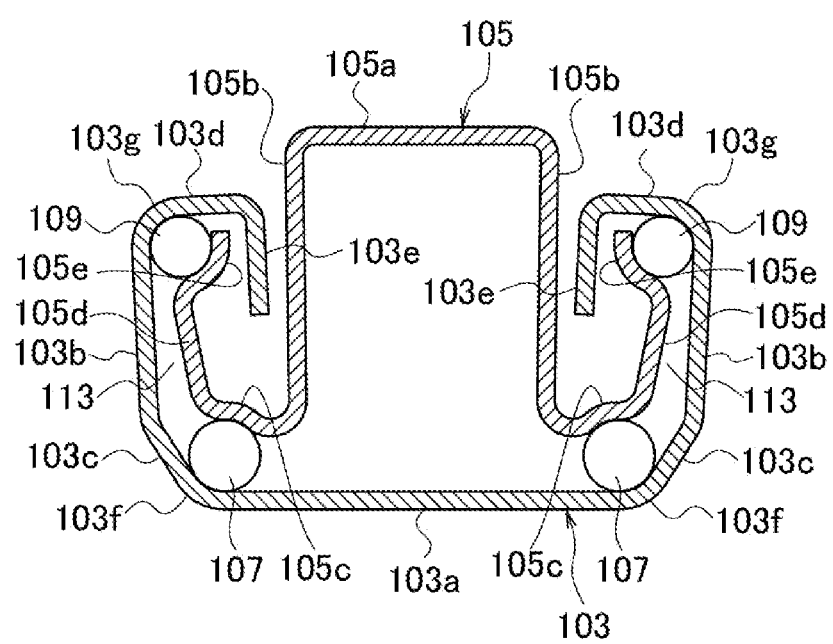
FIG. 2 is a cross-sectional view of the seat sliding device including lower guide balls and upper guide balls positioned between an upper rail and a lower rail.

The lower rail 103 has a lower bottom wall 103a having a rectangular plate shape extending in the vehicle front-rear direction as shown in FIG. 2. A pair of left and right lower outer walls 103b rise from both end edges of the lower bottom wall 103a in a vehicle width direction to tilt slightly outward from the lower bottom wall 103a in the upward direction. Lower tilted walls 103c are formed between lower ends of the pair of left and right lower outer walls 103b and the lower bottom wall 103a. A pair of left and right lower upper walls 103d extending in parallel with the lower bottom wall 103a are provided from upper end edges of the pair of left and right lower outer walls 103b in the direction in which the lower outer walls 103b approach each other.

A pair of left and right lower inner walls 103e are provided which hang down toward the lower bottom wall 103a from inner end edges of the pair of left and right lower upper walls 103d. A clearance between the lower inner walls 103e which are parallel to and face each other is set such that the upper rail 105 housed in the lower rail 103 is movable.

The upper rail 105 has an upper top wall 105a having a rectangular plate shape extending in the vehicle body front-rear direction. A pair of left and right upper side walls 105b hang down from both end edges of the upper top wall 105a in the vehicle width direction. Both upper lower-tilted-walls 105c rise obliquely outward and upward from lower end edges of the left and right upper side walls 105b. Upper upper-tilted-walls 105e rise obliquely upward toward the lower upper walls 103d from upper end edges of the pair of left and right upper lower-tilted-walls 105c via bent portions 105d.

Lower guide balls 107 are rotatably disposed between lower arc portions 103f which are formed between the lower bottom wall 103a and the lower tilted walls 103c of the lower rail 103, and the upper lower-tilted-walls 105c of the upper rail 105. Upper guide balls 109 are rotatably disposed between upper arc portions 103g which are formed between the lower outer walls 103b and the lower upper walls 103d of the lower rail 103, and the upper upper-tilted-walls 105e of the upper rail 105.

As shown in FIG. 1, the lower guide balls 107 and the upper guide balls 109 are rotatably supported in ball retainers 111 which are not shown in FIG. 2. Each of the ball retainers 111 supports a total of four guide balls which are two lower guide balls 107 and two upper guide balls 109. Two ball retainers 111 supporting the lower guide balls 107 and the upper guide balls 109 are disposed at two positions on the front and rear sides in each of housing portions 113 (FIG. 2) surrounded by the lower outer walls 103b, the lower tilted walls 103c, the lower upper walls 103d, and the lower inner walls 103e. Four ball retainers 111 are disposed at a total of four positions in the pair of left and right rail bodies 106.

Figure 14:
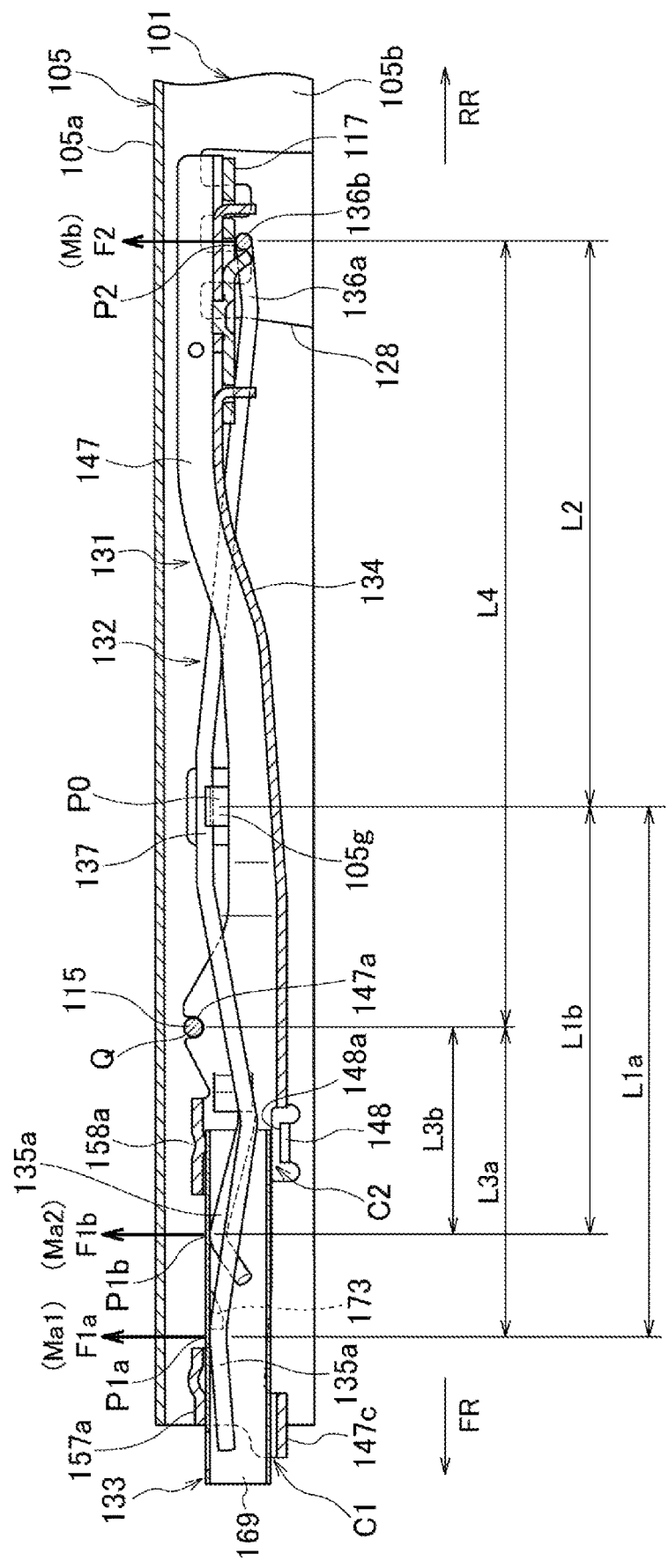
FIG. 14 is a side sectional view of an enlarged main portion of the seat sliding device.

As shown in FIG. 14, in the assembled state of the rail bodies 106, a lever member 131 is turnably supported by a shaft member 115 on the upper side wall 105b on the front side of the upper rail 105. The shaft member 115 extends between the left and right upper side walls 105b so as to span the left and right upper side walls 105b of the upper rail 105. In addition, a lock member 117 is provided at the end of the lever member 131 on the rear side from the turning center (shaft member 115). Meanwhile, an operation member 133 is connected to the end of the lever member 131 on the front side from the turning center (shaft member 115).

Figure 5:
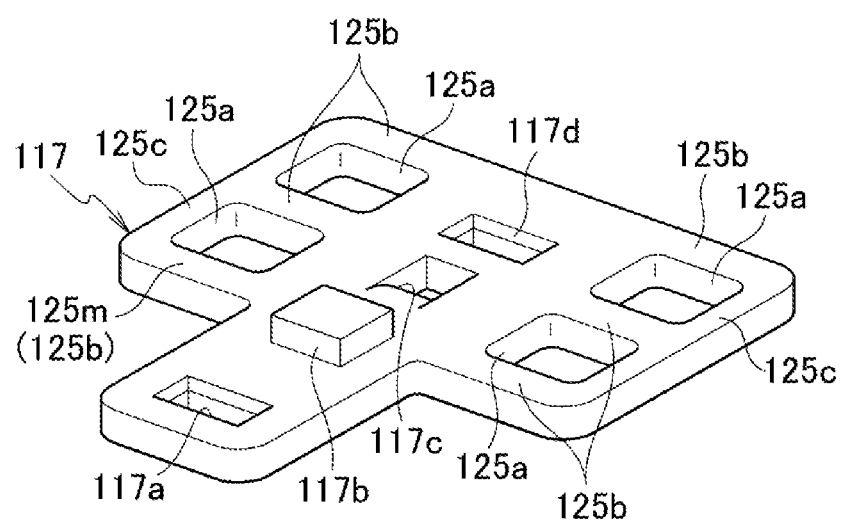
FIG. 5 is a perspective view of a lock member.
Figure 9:
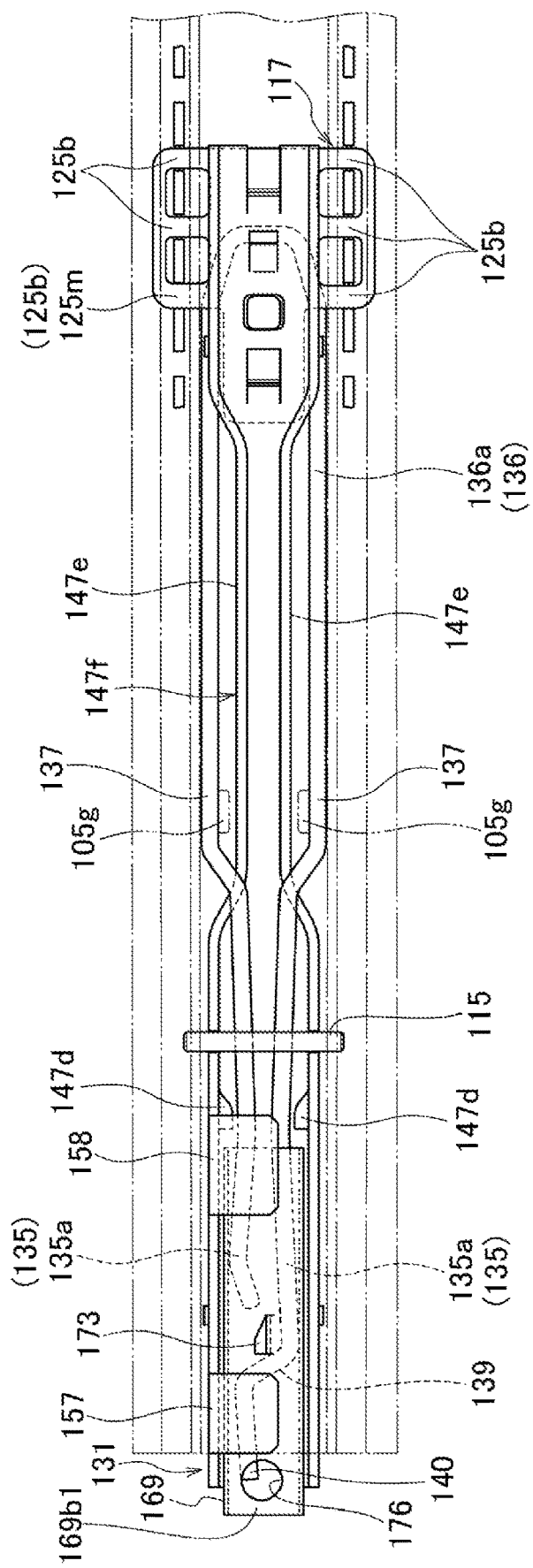
FIG. 9 is a plan view of the lever member and the biasing member as viewed from above.

As shown in FIG. 5 and FIG. 9, the lock member 117 is a flat plate with a convex shape, and two rectangular holes 125a are formed near each of the left and right edges in the front-rear direction. Portions of the lock member 117 adjacent to each hole 125a in the front-rear direction form the lock teeth 125b, which are lock portions, protruding leftward and rightward. The lock teeth 125b are formed at three positions on each of the left and right sides. Distal ends of the lock teeth 125b formed at the three positions on each of the left and right side are configured to be connected to one another by means of connecting portions 125c extending in the front-rear direction.

In the present embodiment, among the lock teeth 125b at three positions on the right side in the vehicle width direction, the lock tooth on the foremost side forms a main lock tooth 125m, which is formed with a larger width in the front-rear direction than other lock teeth 125b. The main lock tooth 125m is only one among the plurality of lock teeth provided on both the left and right sides (six positions).

Further, in the center of the lock member 117 in the left-right direction, a front fixing hole 117a, an upper protrusion 117b protruding upward from the lock member 117, a lower protrusion 117c protruding downward from the lock member 117, and a rear fixing hole 117d are provided in this order from the front to the rear. The upper protrusion 117b is formed by causing a part of the lock member 117 to protrude upward, and the lower protrusion 117c is formed by cutting and displacing a part of the lock member 117 downward.

Figure 4:
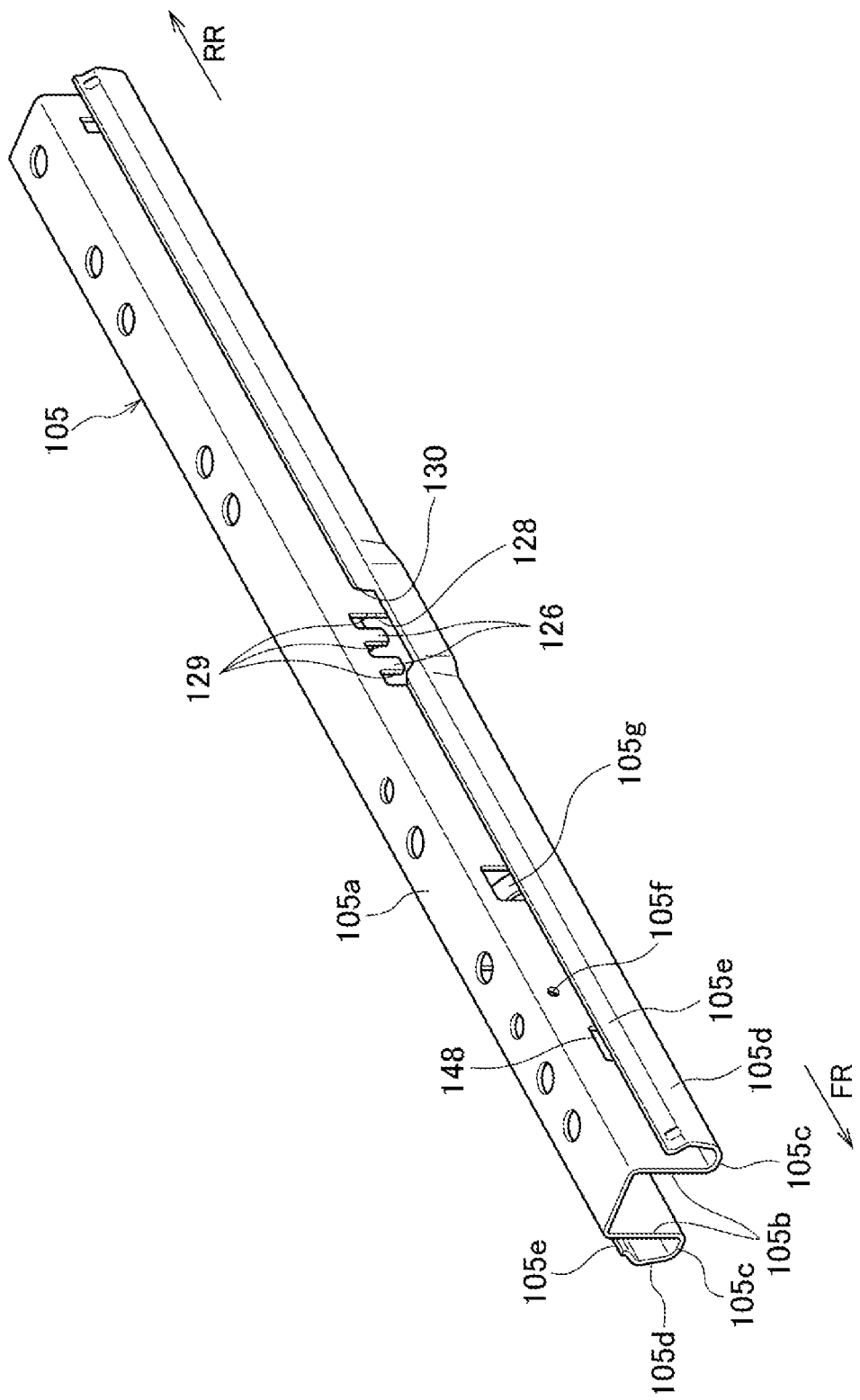
FIG. 4 is a perspective view of the upper rail.

As shown in FIG. 4, lock tooth receiving recesses 129 are formed near a substantially-center portion of the upper rail 105 in the front-rear direction and extend from the left and right upper side walls 105b to the left and right upper lower-tilted-walls 105c. The three lock tooth receiving recesses 129 are formed at three positions on each of the left and right sides in the front-rear direction. In a state where the rail bodies 106 are assembled, the three lock teeth 125b of the lock member 117 are inserted into the three lock tooth receiving recesses 129 from below. At this time, protrusions 126 positioned between the lock tooth receiving recesses 129 are inserted into the holes 125a of the lock member 117. In this case, in order to avoid interference between the upper rail 105 and portions around the connecting portions 125c of the lock member 117, an opening 128 continuous with lower portions of the lock tooth receiving recesses 129 and a notch opening 130 formed in the upper portion of the upper upper-tilted-wall 105e are provided on each of the left and right sides of the upper rail 105.

Further, the left and right upper side walls 105b of the upper rail 105 have bearing holes 105f through which the shaft member 115 is inserted, and a pair of left and right engaging portions 105g that are formed at the same positions with respect to the vehicle front-rear direction and the up-down direction and engage with a biasing member 132 which will be described later. In the upper side walls 105b, the pair of left and right engaging portions 105g are provided at the rear side of the lever member 131 from the turning center (shaft member 115). Further, the engaging portions 105g are formed by cutting and displacing a part of the upper side walls 105b toward the inner side.

Figure 3:
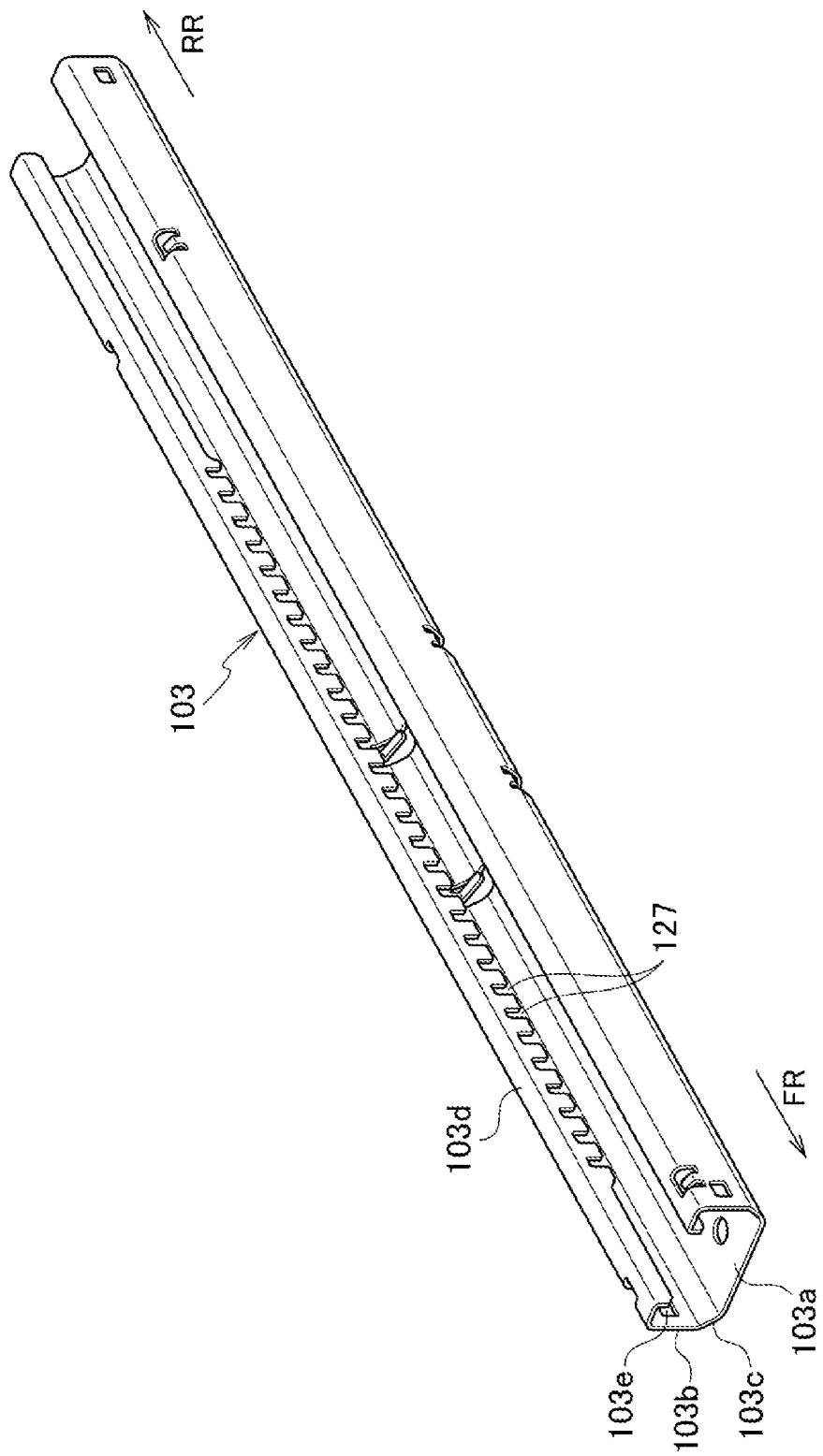
FIG. 3 is a perspective view of the lower rail.

Meanwhile, as shown in FIG. 3, a plurality of lock grooves 127, which are locked portions, are provided in the lower rail 103 in the front-rear direction except for positions near front portions and rear portions of the left and right lower inner walls 103e. The lock member 117 is set to be locked to the lower rail 103 by inserting the lock teeth 125b of the lock member 117 into the lock grooves 127 from below with the lock teeth 125b positioned in the lock tooth receiving recesses 129. This makes it possible to prevent the upper rail 105 to which the lock member 117 is attached from moving relative to the lower rail 103 in the front-rear direction.

The biasing member 132 generates an elastic force upward in the state where the lock member 117 is attached to the upper rail 105, and accordingly, it is possible to maintain the state where the lock teeth 125b are inserted in the lock grooves 127. Operating the operation member 133 shown in FIG. 1 in the lock release direction (upward) in this state causes the lock member 117 to be moved downward via the lever member 131, and accordingly the lock is released. The operation member 133 is inserted into the upper rail 105 from the front side, and is disposed so as to be interlocked with the lever member 131.

Figure 6:
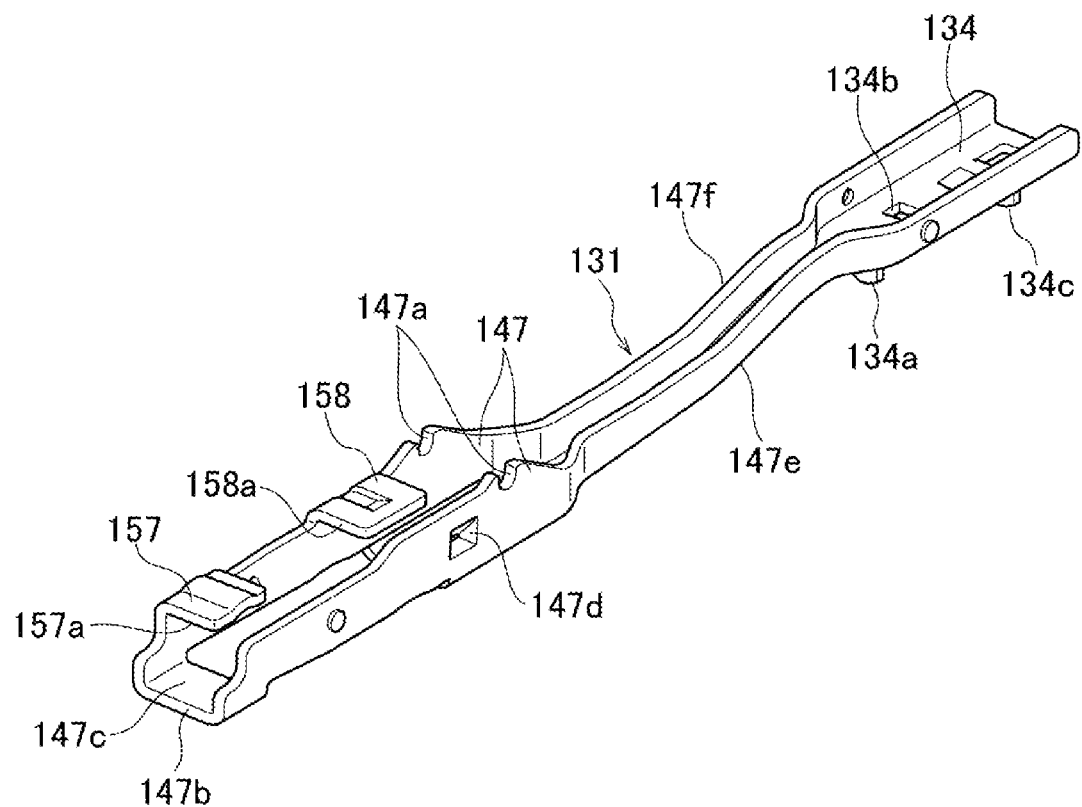
FIG. 6 is a perspective view of a lever member.

As shown in FIG. 6, the lever member 131 includes left and right side walls 147 that extend relative to the upper rail 105 in the longitudinal direction and face each other with a predetermined clearance therebetween in the left-right direction, and a lower wall 134 connecting the lower ends of the left and right side walls 147 to each other in a region excluding the ends of the left and right side walls 147 on the front side.

Figure 10A:
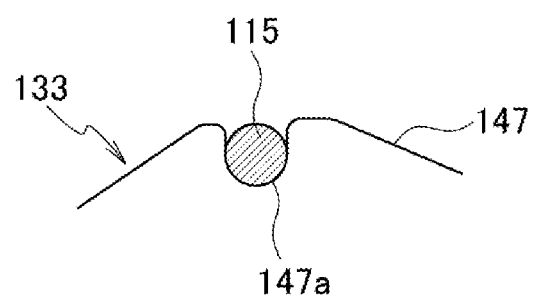
FIG. 10A is a side sectional view of an enlarged main portion of the seat sliding device showing one bearing.
Figure 10B:
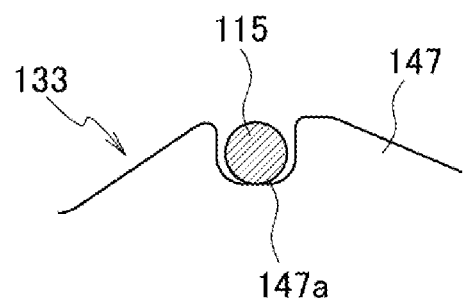
FIG. 10B is a side sectional view of an enlarged main portion of the seat sliding device showing the other bearing.

A pair of left and right recessed grooves 147a, which are bearings, are formed at the upper ends of the side walls 147 on the front side from the intermediate position of the lever member 131 in the front-rear direction. Of the pair of left and right recessed grooves 147a, the lower surface of the right recessed groove 147a is formed as a semi-circular arc-shaped surface with a radius slightly larger than the outer diameter of the shaft member 115 (see FIG. 10A), and the lower surface of the left recessed groove 147a is formed as a flat surface extending in the vehicle front-rear direction (see FIG. 10B). The recessed grooves 147a engage with the shaft member 115 from below, and the lever member 131 is biased upward at both the front and rear ends so as to maintain a state in which the recessed grooves 147a engage with the shaft member 115, and accordingly both the lower surfaces of the pair of left and right recessed grooves 147a are in contact with the shaft member 115 at one point in the up-down direction. The radius of the aforementioned arc-shaped surface is set slightly larger than the outer diameter of the shaft member 115 to the extent that the engagement with the shaft member 115 does not become a pressed fit due to variations in dimensions.

Although not shown in the diagrams, in another embodiment, one bearing of the pair of left and right bearings may be formed as a round hole and the other bearing may be formed as an elongated hole extending in the vehicle front-rear direction.

Further, at the lower wall 134 at the rear end of the lever member 131, a front protrusion 134a protruding downward from the lower wall 134, a positioning hole 134b, and a rear protrusion 134c protruding downward from the lower wall 134 are provided in this order from the front to the rear. Both the front protrusion 134a and the rear protrusion 134c are formed by cutting and displacing a part of the lower wall 134 downward.

The front protrusion 134a and the rear protrusion 134c of the lever member 131 are inserted into the front fixing hole 117a and the rear fixing hole 117d of the lock member 117 respectively, and the upper protrusion 117b of the lock member 117 is inserted into the positioning hole 134b of the lever member 131 by press fitting. In this state, the lock member 117 is fixed to the rear end of the lever member 131 by staking both the front protrusion 134*a* and the rear protrusion 134*c* (see FIG. 14).

The lower ends of the front ends of the lever member 131 are connected to each other by means of a front lower wall 147*b* as a front lower support portion extending in the left-right direction facing toward the lower end on the opposite side. The upper surface of the front lower wall 147*b* forms a front lower support surface 147*c*. At the upper end of the front end of one of the left and right side walls 147, a front upper protrusion 157 is formed as a front upper support portion extending inwardly in the left-right direction in a bending manner from one of the side walls 147 toward the other of the side walls 147 facing the one of the side walls 147. That is, the upper support portion has a front upper protrusion 157 as a front upper support portion provided more to the front side than the turning center (shaft member 115) of the lever member 131. The lower surface of the front upper protrusion 157 constitutes a front upper support surface 157*a*.

At the upper ends of the front ends of both side walls 147, front upper protrusions 157 may be formed as front upper support portions extending in the left-right direction from both side walls 147 in such a way to bend toward the opposite sides facing each other. The tips of the left and right front upper protrusions 157 are separated from each other, and a gap is formed therebetween.

At the upper portion of one of the left and right side walls 147, which are positioned rearward of the front upper protrusions 157 and forward of the recessed grooves 147*a*, a rear upper protrusion 158 is formed as a rear upper support portion that extends inwardly in the left-right direction in a bending manner from one of the side walls 147 to the other of the side walls 147 facing the one of the side walls 147. That is, the upper support portion has the rear upper protrusion 158 as the rear upper support portion provided between the turning center (shaft member 115) of the lever member 131 and the front upper support portion (front upper protrusion 157). The lower surface of the rear upper protrusion 158 constitutes a rear upper support surface 158*a*. That is, a pair of front and rear upper support surfaces (front upper support surface 157*a* and rear upper support surface 158*a*) facing an upper surface 169*b*1 of the rear end of the operation member 133 are provided at the front end of the lever member 131. Here, the pair of front and rear upper support surfaces are provided with a clearance therebetween in the vehicle front-rear direction. Further, the front lower support surface 147*c* facing a lower surface 169*b*3 of the rear end of the operation member 133 is provided below the front upper support surface 157*a* at the front end of the lever member 131.

At the upper portions of both side walls 147, which are positioned rearward of the front upper protrusions 157 and forward of the recessed grooves 147*a*, rear upper protrusions 158 may be formed as rear upper support portions extending in the left-right direction from both side walls 147 in such a way to bend toward the opposite sides facing each other. In this case, the tips of the left and right rear upper protrusions 158 are separated from each other, and a gap is formed therebetween.

The front end of the lever member 131 is formed into a substantially square cross section by the front upper support surface 157*a*, the front lower support surface 147*c*, and both side walls 147, and the rear end of the operation member 133 is inserted inside the front end of the lever member 131.

In addition, movement prevention protrusions 147*d* protruding from both side walls 147 toward the sides facing each other are formed on both side walls 147 which are positioned rearward of the rear upper protrusions 158 and forward of the recessed grooves 147*a*. The movement prevention protrusions 147*d* are formed by causing a part of both side walls 147 to protrude inward.

In addition, a pair of left and right recesses 147*e* are provided on both side walls 147 which are positioned rearward of the recessed grooves 147*a* and forward of the front protrusion 134*a*, and a narrow portion 147*f* is formed having a clearance between both side walls 147 that is narrower than the clearance between the front ends and the clearance between the rear ends. A gap in the left-right direction is thereby formed between the pair of upper side walls 105*b* of the upper rail 105 and the narrow portion 147*f*.

Figure 7:
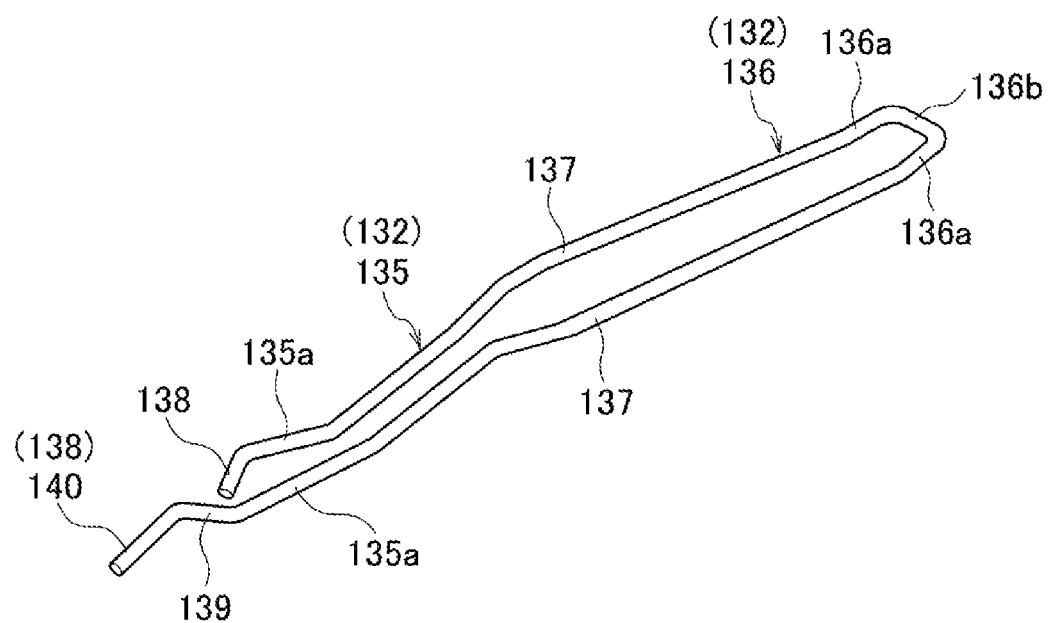
FIG. 7 is a perspective view of a biasing member.

As shown in FIG. 7, the biasing member 132 is formed of a pair of left and right elongated bar-shaped members extending approximately parallel to each other, and extends in the front-rear direction along the upper side walls 105*b* of the upper rail 105 inside the upper rail 105. The biasing member 132 has a front biasing member 135 including a pair of left and right front acting portions 135*a* which come in contact with the front end of the lever member 131 to bias the front end of the lever member 131 upward. In addition, the biasing member 132 has a rear biasing member 136 including a pair of left and right rear acting portions 136*a* which come in contact with the rear end of the lever member 131 to bias the rear end of the lever member 131 upward. In addition, the biasing member 132 has a pair of left and right intermediate support portions 137 formed between the front acting portions 135*a* and the rear acting portions 136*a* and engaged with a pair of left and right engaging portions 105*g* provided on the upper side walls 105*b* of the upper rail 105.

The rear biasing member 136 has a connecting portion 136*b* extending from the intermediate support portions 137 to the rear acting portions 136*a* along the inner surfaces of the left and right upper side walls 105*b*, and the pair of left and right rear acting portions 136*a* are connected to each other by the connecting portion 136*b* positioned at the rear end of the rear biasing member 136. Accordingly, the rear biasing member 136 (biasing member 132) is formed into an approximately U-shape in a plan view. The connecting portion 136*b* of the rear biasing member 136 comes in contact with the lower surface of the lock member 117 from below, and accordingly the rear side acting portions 136*a* (connecting portion 136*b*) bias the lock member 117 upward (in the lock position direction). The connecting portion 136*b* of the rear biasing member 136 is positioned between the lower protrusion 117*c* and the rear protrusion 134*c*, thereby defining the range of movement of the rear biasing member 136 (biasing member 132) in the front-rear direction.

The rear end of the rear biasing member 136 (the pair of left and right rear acting portions 136*a* and connecting portion 136*b*) is positioned below the lever member 131 and the lock member 117, and the intermediate portions (the pair of left and right intermediate support portions 137) extend upward of the lever member 131 through the recesses 147*e* (gap between the narrow portion 147*f* and the upper side wall 105*b*).

Meanwhile, the front biasing member 135 extends from the intermediate support portions 137 to the front acting portions 135*a* along the inner surfaces of the left and right upper side walls 105*b*. The pair of left and right front acting portions 135*a* of the biasing member 132 are biased by means of the elastic force of the biasing member 132 so as to be separated from each other in the left-right direction outward, and are also biased upward. The pair of left and right front acting portions 135*a* of the front biasing member 135 separately come in contact with the inner surface the operation member 133 from below, and each of the front acting portions 135a biases the front end of the lever member 131 upward via the operation member 133.

At the front portions (tips) of the pair of left and right front acting portions 135a, guide portions 138 are formed which are tilted with respect to the vehicle front-rear direction to guide the entry of the front acting portions 135a into the connection end 169 of the operation member 133 when the operation member 133 is attached to the lever member 131. In addition, the pair of left and right front acting portions 135a are separately brought into contact with the front end of the lever member 131 at different positions with respect to the vehicle front-rear direction between the front upper support surface 157a and the rear upper support surface 158a. Further, of the pair of left and right front acting portions 135a, the front acting portion 135a disposed on the front side has a retaining portion 139 extending in the left-right direction from one side to the other side of a flat portion 170a of the operation member 133 in the left-right direction. Furthermore, of the pair of left and right front acting portions 135a, the front acting portion 135a disposed on the front side has a release portion 140 that further extends to the front side from the retaining portion 139. The release portion 140 is tilted to face inward in the left-right direction and extends to the front side to tilt downward.

That is, of the pair of left and right front acting portions 135a, the front acting portion 135a disposed on the front side has an approximate crank shape bent from one end to the other end of the flat portion 170a in the left-right direction. The part, of the front acting portion 135a disposed on the front side, extending in the left-right direction functions as the retaining portion 139, and the part, of the front acting portion 135a disposed on the front side, extending in the front-rear direction along the other end of the flat portion 170a functions as the release portion 140.

The front biasing member 135 extends forward between both side walls 147 with the rear ends (the pair of left and right intermediate support portions 137) positioned above the lever member 131 and the front ends (the pair of left and right front acting portion 135a, guide portion 138, retaining portion 139, and release portion 140) bent inward so as to approach each other.

The front biasing member 135 and the rear biasing member 136 are integrally formed (one member).

Although not shown in the diagrams, the front biasing member 135 and the rear biasing member 136 may be separate components (separate members) in another embodiment.

As shown in FIG. 1, the operation member 133 includes a pair of left and right arms 167 provided respectively for the pair of left and right rail bodies 106, and a grip 168 which extends in the vehicle width direction and connects the pair of left and right arms 167 to each other. The pair of left and right arms 167 extend in the front-rear direction and rear ends thereof are inserted within front ends of the left and right upper rails 105. The grip 168 is gripped by an occupant when the occupant operates the operation member 133.

As shown in FIG. 14, the rear end of the arm 167 is inserted between the left and right side walls 147 of the lever member 131. The arm 167 is formed of a cylindrical member as a whole including the grip 168, and the rear end of the arm 167 described above is a connection end 169 serving as a rear connecting portion formed by press molding of the cylindrical member.

Figure 8:
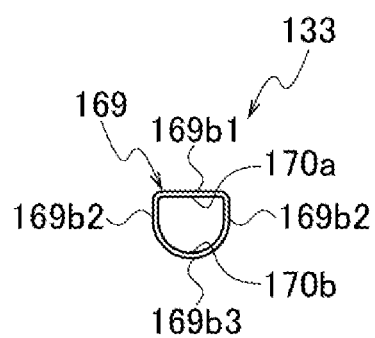
FIG. 8 is a rear view of a rear end of an operation member as viewed from the rear.

As shown in FIG. 8 the connection end 169 includes an upper surface 169b1, side surfaces 169b2 extending downward from both left and right ends of the upper surface 169b1, and a lower surface 169b3 provided at the lower ends of the left and right side surfaces 169b2. The connection end 169 is formed into a substantially semicircular cross section having a flat portion 170a at the upper portion and an arc-shaped portion 170b which is downwardly convex at the lower portion. The pair of left and right front acting portions 135a of the front biasing member 135 are disposed at both left and right ends of the flat portion 170a. That is, the pair of left and right front acting portions 135a are disposed at the outer ends of the flat portion 170a in the left-right direction by means of the elastic force of the front acting portions 135a.

Figure 11A:
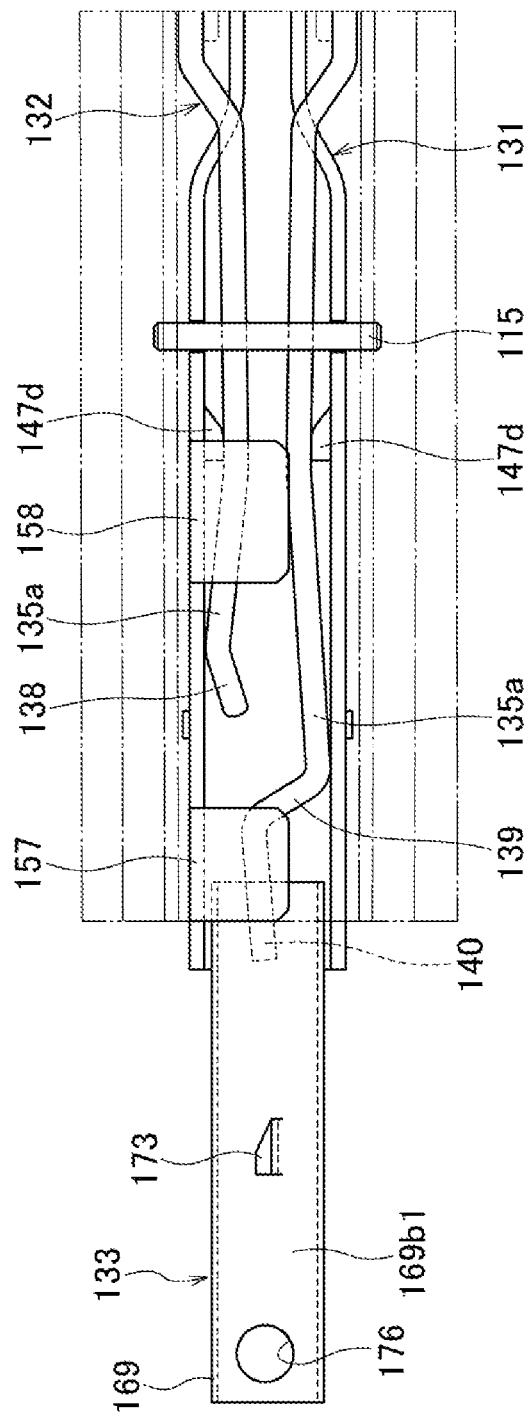
FIG. 11A is a plan view of the lever member as viewed from above before the operation member is attached.
Figure 11B:
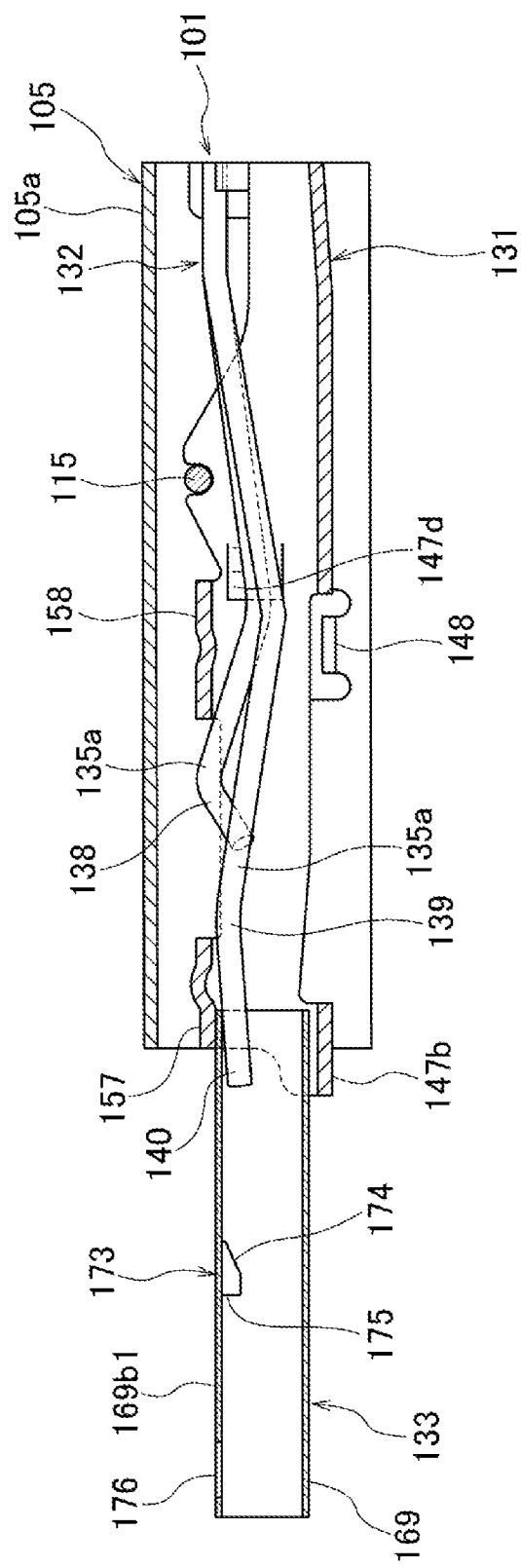
FIG. 11B is a side sectional view of an enlarged main portion of the seat sliding device showing the state before the operation member is attached.

In addition, as shown in FIGS. 11A and 11B, an inner protrusion 173 protruding downward from the flat portion 170a is formed on the upper inner surface of the connection end 169. The inner protrusion 173 is formed by cutting and displacing a part of the flat portion 170a of the connection end 169 toward the lower side. That is, the inner protrusion 173 is formed by bending a part of the flat portion 170a of the connection end 169 so as to protrude inward.

An inclined surface 174 inclined relative to the flat portion 170a is formed at the rear of the inner protrusion 173 such that the retaining portion 139 can pass over the inner protrusion 173 when the operation member 133 is attached to the lever member 131. In addition, an engaging surface 175 orthogonal to the flat portion 170a is formed at the front portion of the inner protrusion 173 such that the operation member 133 is prevented from moving forward in a state where the operation member 133 is attached to the lever member 131 and the retaining portion 139 and the inner protrusion 173 are engaged with each other.

Further, a through-hole 176 that penetrates into the interior of a cylindrical portion of the operation member 133 is formed in the upper surface 169b1 of the part that is forward of the part inserted into the lever member 131, of the connection end 169 that is the cylindrical portion of the operation member 133. Furthermore, the through-hole 176 is formed at a position which is forward of the inner protrusion 173 of the flat portion 170a and is on the upper surface 169b1 of the connection end 169 so as to face the front end of the release portion 140. The through-hole 176 is formed to a size that allows the insertion of a bar-shaped release member 180 (see FIGS. 12A and 12B) from above (the upper surface 169b1), and in the present embodiment, the through-hole 176 is constituted by a round hole. The release member 180 is used to release the engagement between the retaining portion 139 and the inner protrusion 173, and may be a dedicated member for disengaging the aforementioned engagement or a tool such as a screwdriver.

In the present embodiment, the through-hole 176 is formed in the upper surface 169b1 of the connection end 169, but the through-hole 176 may be formed in the lower surface 169b3 of the connection end 169. In this case, the through-hole 176 is formed to a size that allows the insertion of the bar-shaped release member 180 (see FIGS. 12A and 12B) from below (lower surface 169b3), and the shape of the release member 180 is suitably set such that the release portion 140 can be pulled from below.

Before the operation member 133 is attached to the lever member 131, the front end (an abutment portion) of the biasing member 132 is made to come into contact with the front upper support surface 157a or the rear upper support surface 158a of the lever member 131. That is, the pair of left and right front acting portions 135a of the biasing member 132 come into contact with the front upper support surface 157a or the rear upper support surface 158a of the lever member 131. In addition, the pair of left and right movement prevention protrusions 147d formed on the lever member 131 come into contact with the pair of left and right front acting portions 135a in the left-right direction. In a state where the operation member 133 is attached to the lever member 131 (see FIG. 14), the front end (abutment portion) of the biasing member 132 comes into contact with the lower surface of the operation member 133 (the inner surface of the upper surface 169b1) from below to bias the operation member 133 upward.

Next, a description will be given regarding a procedure for assembling the operation member 133 to the rail body 106 (the lever member 131) and an example of an operation of disassembling the operation member 133 from the rail body 106 (the lever member 131).

(1) Before Attaching the Operation Member 133

The pair of left and right front acting portions 135a are in contact with the upper support surfaces (front upper support surface 157a, rear upper support surface 158a) of the lever member 131 and the movement prevention protrusion 147d, and are individually disposed at upper end inner portions of the left and right side walls 147, and are inclined to face the center in the left-right direction and the up-down direction such that each guide portion 138 enters into the connection end 169 of the operation member 133 (see FIG. 11A).

(2) When the Operation Member 133 is Attached

When the operation member 133 moves backward, the pair of left and right front acting portions 135a are pushed downward by the guide portions 138 and move so as to be brought close to the inner sides in the left-right direction, thereby entering into the connection end 169 of the operation member 133. The retaining portion 139 of the front acting portion 135a on the left side in the vehicle width direction passes over the inner protrusion 173 by being pushed downward by the inclined surface 174 of the inner protrusion 173.

(3) After the Operation Member 133 is Attached

The engaging surface 175 of the inner protrusion 173 faces the front acting portion 135a on the left side in the vehicle width direction, thereby preventing the operation member 133 from moving forward (in the removal direction). Further, the rear end surface of the operation member 133 faces the movement prevention protrusions 147d, thereby preventing the operation member 133 from further moving backward (in the pushing direction).

(4) Operation for Removing the Operation Member 133

Figure 12A:
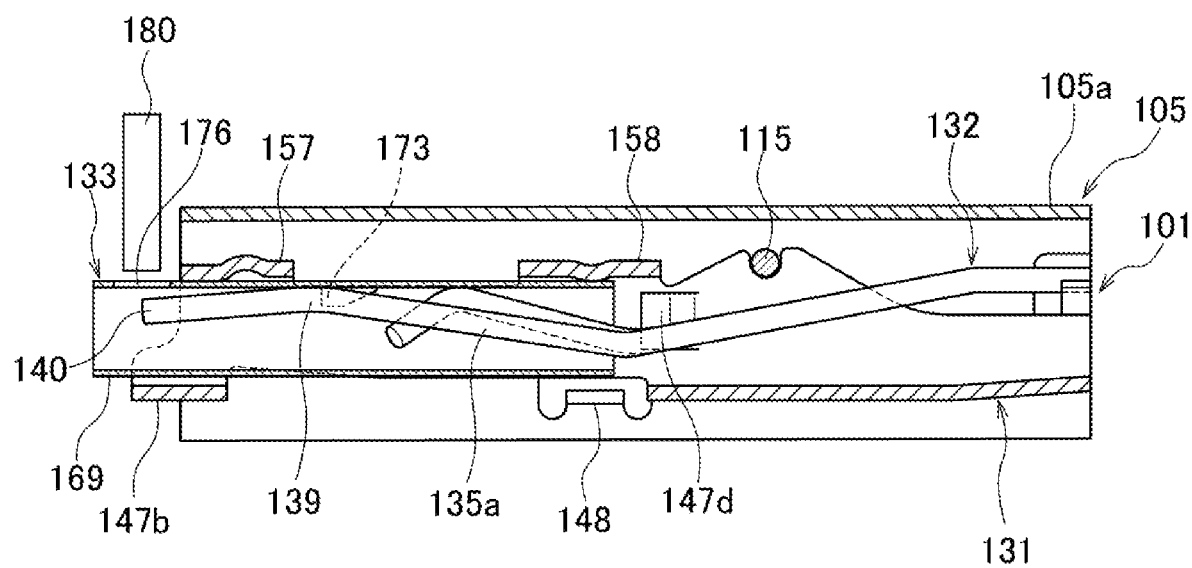
FIG. 12A is a side sectional view of an enlarged main portion of the seat sliding device before an operation to remove the operation member.
Figure 12B:
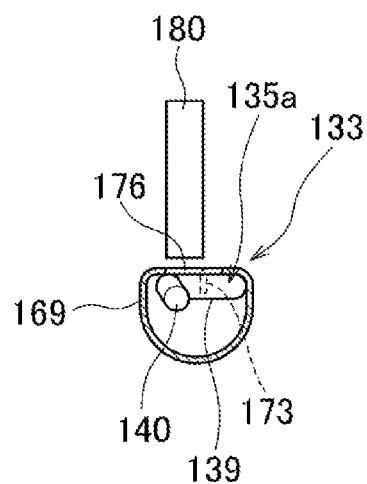
FIG. 12B is a cross-sectional view of the operation member shown in FIG. 12A.
Figure 13A:
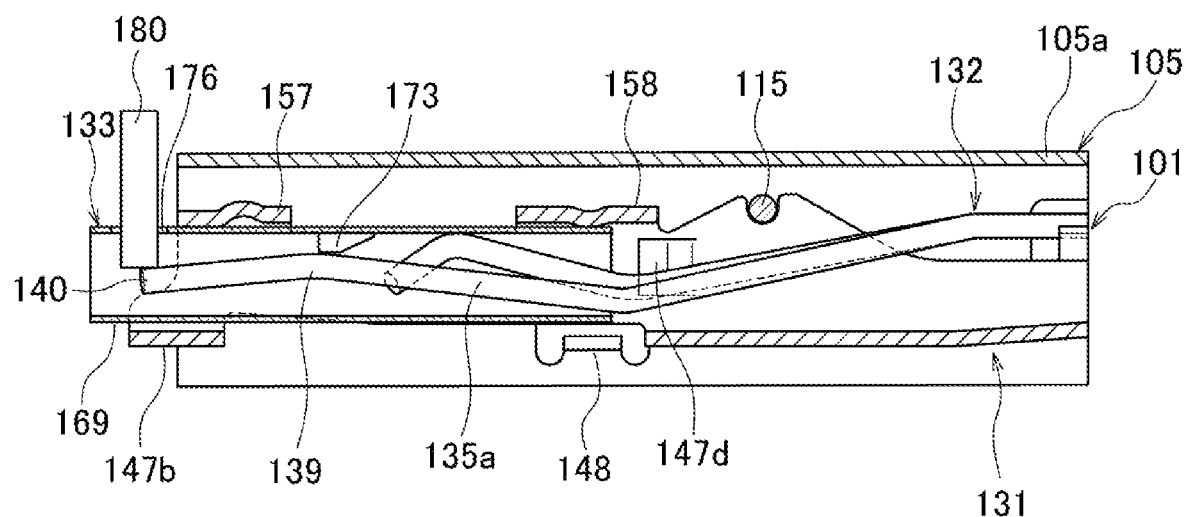
FIG. 13A is a side sectional view of an enlarged main portion of the seat sliding device during an operation to remove the operation member.
Figure 13B:
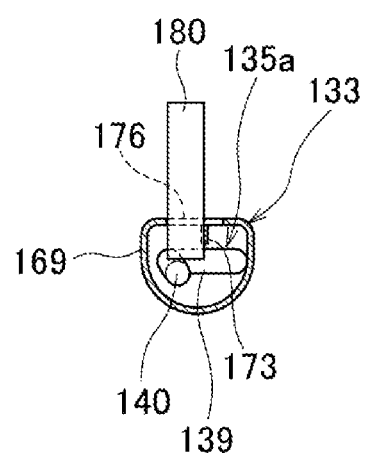
FIG. 13B is a cross-sectional view of the operation member shown in FIG. 13A.

In the present embodiment, the operation member 133 is removed by pushing the operation member 133 from above (upper surface 169b1) by means of the release member 180 (see FIGS. 12A and 12B). The release member 180 is inserted into the inside of the connection end 169 of the operation member 133 through the through-hole 176, the front end of the release portion 140 is pushed downward by means of the inserted release member 180, and accordingly the engagement between the retaining portion 139 and the engaging surface 175 of the inner protrusion 173 is disengaged (see FIGS. 13A and 13B).

As shown in FIG. 14, the lever member 131 is turnably supported at the upper side walls 105b of the upper rail 105 by the shaft member 115, and the biasing member 132 is engaged with the engaging portion 105g in such a way as to prevent the biasing member 132 from moving downward. In addition, on the left and right upper side walls 105b of the upper rail 105, a rear lower protrusion 148 is formed at a position forward of the bearing hole 105f in the vehicle front-rear direction as a rear lower support portion protruding from both upper side walls 105b in such a way as to bend toward the sides facing each other. The rear lower protrusion 148 is formed by cutting and displacing the upper side walls 105b toward the inner side.

The pair of front acting portions 135a of the biasing member 132 engage with the lower surface of the rear end of the operation member 133 (the inner surface of the upper surface 169b1) from below at a lower position between the front upper support surface 157a and the rear upper support surface 158a, thereby biasing the operation member 133 upward. Accordingly, the upper surface 169b1 of the operation member 133 comes into contact with the pair of upper support surfaces (front upper support surface 157a and rear upper support surface 158a). At this time, a clearance C1 is provided in the up-down direction between the front lower support surface 147c provided in the lever member 131 and the lower surface 169b3 of the rear end of the operation member 133, and a clearance C2 is provided in the up-down direction between the rear lower support surface 148a provided in the upper rail 105 and the lower surface 169b3 of the rear end of the operation member 133.

In this regard, as shown in FIG. 14, on one side (right side in the vehicle width direction), regarding the length L1b between the contact point between the engaging portion 105g and the intermediate support portion 137 of the biasing member 132 (support point P0) and the contact point between the front end of the lever member 131 and the front acting portion 135a of the biasing member 132 (front acting point P1b), and regarding the length L2 between the contact point between the engaging portion 105g and the intermediate support portion 137 of the biasing member 132 (support point P0) and the contact point between the rear end of the lever member 131 and the rear acting portion 136a of the biasing member 132 (rear acting point P2), the length L1b is shorter than the length L2 (L1b<L2).

In contrast, on the other side (left side in the vehicle width direction), regarding the length L1a between the contact point between the engaging portion 105g and the intermediate support portion 137 of the biasing member 132 (support point P0) and the contact point between the front end of the lever member 131 and the front acting portion 135a of the biasing member 132 (front acting point P1a), and regarding the length L2 between the contact point between the engaging portion 105g and the intermediate support portion 137 of the biasing member 132 (support point P0) and the contact point between the rear end of the lever member 131 and the rear acting portion 136a of the biasing member 132 (rear acting point P2), the length L1a is approximately the same as the length L2 (L1a≈L2).

The rotational moment at the support point P0 is [F1a*L1a+F1b*L1b=F2*L2] from the moment balance [M0=(F1a*L1a+F1b*L1b)−F2*L2=0] when the biasing forces acting on the front acting points P1a and P1b are front biasing forces F1a and F1b and when the biasing force acting on the rear acting point P2 is a rear biasing force F2. In the present embodiment, the length L1b between the support point P0 and one front acting point P1b is set to be shorter than the length L2 between the support point P0 and the rear acting point P2 (L1b<L2). In contrast, in the present embodiment, the length L1a between the support point P0 and the other front acting point P1a is almost the same as the length L2 between the support point P0 and the rear acting point P2 (L1a≈L2). That is, the force (F1a+F1b) that biases the front end of lever member 131 upward (in the lock release direction) is larger than the force F2 that biases the rear end of lever member 131 upward (in the locking direction) ((F1a+F1b)>F2).

Here, the length between the turning center Q of the lever member 131 and the contact point between the front end of the lever member 131 and the other front acting portion 135*a* of the biasing member 132 (front acting point P1*a*) is defined as "L3*a*". In contrast, the length between the turning center Q of the lever member 131 and the contact point between the front end of the lever member 131 and one front acting portion 135*a* of the biasing member 132 (front acting point P1*b*) is defined as "L3*b*". In addition, the length between the turning center Q of the lever member 131 and the contact point between the rear end of the lever member 131 and the rear acting portion 136*a* of the biasing member 132 (rear acting point P2) is defined as "L4". At this time, the lengths L3*a*, L3*b*, and L4 are set such that the rotational moment on the rear end side (Mb=F2*L4) is larger than a total Ma of the rotational moments on the front-end side (Ma1+Ma2=F1*a*\*L3*a*+F1*b*\*L3*b*) at the turning center Q of the lever member 131.

In the present embodiment, the length L3*a* is shorter than the length L1*a* (L1*a*>L3*a*), the length L3*b* is shorter than the length L1*b* (L1*b*>L3*b*), and the length L2 is shorter than the length L4 (L2<L4). This makes it possible for the rotational moment on the rear end side (Mb=F2*L4) to become larger than the total Ma of the rotational moments on the front-end side (Ma1+Ma2=F1*a*\*L3*a*+F1*b*\*L3*b*) at the turning center Q of the lever member 131.

Therefore, the rotational moment at the turning center Q of the lever member 131 acts as a biasing force that biases the rear end of the lever member 131 (lock member 117) in the locking direction.

Next, the operation of the seat sliding device 101 configured as above will be described.

FIG. 14 shows a standby state in which the lock teeth 125*b* of the lock member 117 engage with the locking grooves 127 of the lower rail 103 and are locked thereto, in the lock position (a non-operating state in which the operation member 133 is not operated). In this state, the operation member 133 is pressed against the pair of upper support surfaces (front upper support surface 157*a* and rear upper support surface 158*a*) by means of the front end of the biasing member 132 (abutment portion). The pressing force (biasing force) of the front end of the biasing member 132 is larger than a force that causes the operation member 133 to move downward due to its own weight. Meanwhile, the rotational moment for rotationally biasing the lock member 117 in the lock release position direction is smaller than the rotational moment in the lock position direction generated by the pressing force (biasing force) at the rear end of the biasing member 132, and therefore the standby state described above is maintained.

Figure 15:
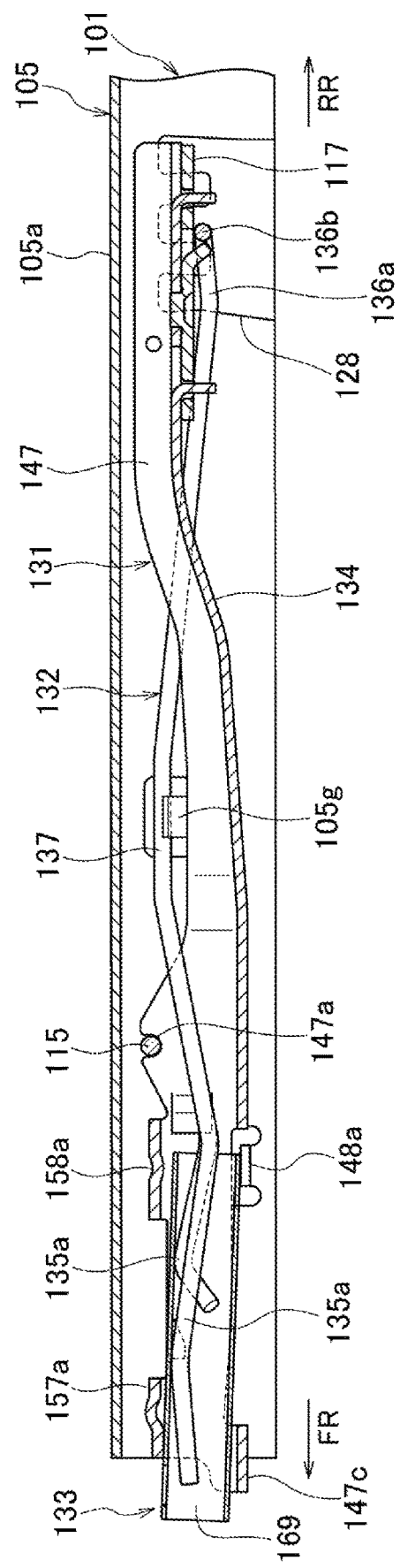
FIG. 15 is a side sectional view of an enlarged main portion of the seat sliding device showing a state where the operation member is operated in a lock release direction.

From the state shown in FIG. 14, when the occupant lifts the grip 168 of the operation member 133, the operation member 133 turns around the contact point between the front upper support surface 157*a* and the upper surface 169*b*1 of the operation member 133 as a fulcrum, and the rear end of the operation member 133 moves downward by pushing down the front end of the biasing member 132 (abutment portion). In this state, when the grip 168 of the operation member 133 is further lifted, the lower surface 169*b*3 of the rear end of the operation member 133 comes into contact with the rear lower support surface 148*a* provided in the upper rail 105, and the operation member 133 turns around the contact point between the rear lower support surface 148*a* and the lower surface 169*b*3 of the rear end of the operation member 133 as a fulcrum. Accordingly, the upper surface 169*b*1 of the operation member 133 turns and lifts the front upper support surface 157*a* of the lever member 131 upward, and the lever member 131 turns the lock portion of the lock member 117 in the lock release position direction (see FIG. 15).

Accordingly, the lever member 131 swings and rotates clockwise in FIG. 14 around the shaft member 115. At this time, the lever member 131 pushes the lock member 117 downward due to the swinging rotation, and the biasing member 132 (rear biasing member 136) elastically deforms downward. As a result, the lock teeth 125*b* come away from the lock grooves 127 of the lower rail 103, and thus the lock is released (lock release state). When the lock is released, it is possible to move the seat (not shown) back and forth with respect to the floor surface of the vehicle of the lower rail 103 side together with the upper rail 105, and secure the seat position desired by the occupant.

When the occupant releases his or her hand from the operation member 133 in a state where the seat position is determined, the biasing member 132 (rear biasing member 136) presses the lock member 117 upward, and the lever member 131 swings and rotates to return to the standby state shown in FIG. 14. At this time, the lever member 131 swings and rotates counterclockwise in FIG. 14 around the shaft member 115.

Figure 16:
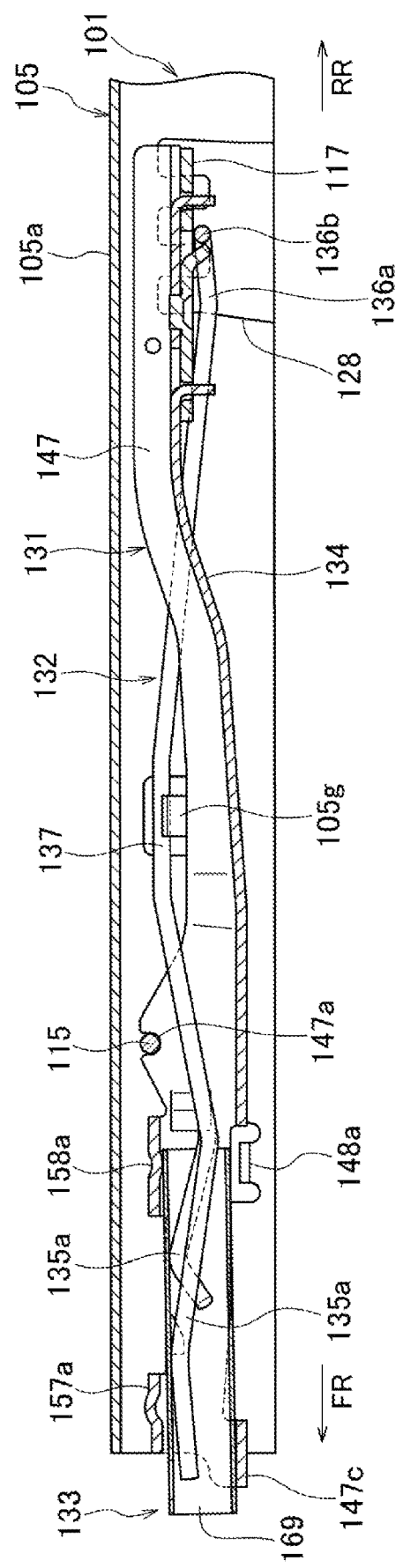
FIG. 16 is a side sectional view of an enlarged main portion of the seat sliding device showing a state where the load in the anti-lock release direction acts on the operation member.

In the state shown in FIG. 14, when a load is applied to the operation member 133 in the anti-lock release direction (downward), the operation member 133 turns around the contact point between the rear upper support surface 158*a* and the upper surface 169*b*1 of the operation member 133 as a fulcrum, and the operation member 133 can move downward by the amount of the clearance C1 between the lower surface 169*b*3 of the operation member 133 and the front lower support surface 147*c* (see FIG. 16). At this time, the lever member 131 turns downward around the interlock position of the main lock tooth 125*m*, and the lower surface of the front end side of both side walls 147 comes in contact with the rear lower support surface 148*a* to prevent the lever member 131 from moving downward, thereby preventing the recessed grooves 147*a* from coming away from the shaft member 115.

The operational effect of the seat sliding device 101 according to the present embodiment will be described below.

(1) The seat sliding device 101 includes: the lower rail 103 extending in a vehicle front-rear direction; the upper rail 105 that moves relative to the lower rail 103 in a longitudinal direction; the lever member 131 turnably supported about an axis in a left-right direction with respect to the upper rail 105; the lock member 117 which is provided at the rear end of the lever member 131 and includes lock portions (lock teeth 125*b*) that can move between a lock position where the lock portions engage with locked portions (lock grooves 127) formed in the lower rail 103 and a lock release position where the lock portions come away from the locked portions; the rear biasing member 136 that biases the lock portions in a lock position direction; and the operation member 133 connected to a front end of the lever member 131. The lever member 131 includes: a pair of left and right side walls 147 extending along the longitudinal direction of the upper rail 105; an upper support portion (front upper protrusion 157, rear upper protrusion 158) which is provided at the upper end of the front end of at least one side wall 147 of the pair of left and right side walls 147 and extends toward the other side wall 147 in the left-right direction; and a lower support portion (front lower wall 147*b*) which is provided at the lower end of the front end of at least one side wall 147 of the pair of left and right side walls 147 and extends toward the other side wall 147 in the left-right direction. The front end of the lever member 131 is formed into a substantially square cross section by the pair of left and right side walls 147, the upper support portion, and the lower support portion, and the cylindrical portion (connection end 169) of the operation member 133 is inserted inside this front end of the lever member. The front biasing member 135 is provided, which is formed of a bar-shaped member, and has a support portion engaged with the engaging portion 105g provided in the upper rail 105, and a front end inserted inside the cylindrical portion of the operation member 133. The retaining portion 139 and the release portion 140 are formed at the front end of the front biasing member 135. The retaining portion 139 biases the operation member 133 upward and presses the operation member 133 against the upper support portion, and engages with the inner protrusion 173 provided at the operation member 133 and prevents the operation member 133 from moving forward. The release portion 140 extends forward from the retaining portion 139. The through-hole 176 that penetrates into the interior of the cylindrical portion of the operation member 133 is formed in the upper surface 169b1 or the lower surface 169b3 of the part that is forward of the part inserted into the lever member 131, of the cylindrical portion of the operation member 133, so as to face the release portion 140.

Since the structure is such that the front biasing member 135 is inserted into the inside of the cylindrical portion of the operation member 133, there is no need to provide the front biasing member 135 in the space in the up-down direction of the lever member 131 and the operation member 133, and a large space can be ensured for the lever member 131 and the operation member 133 to operate. For this reason, the layout of the lever member 131 and the operation member 133 is good.

Since the front end of the front biasing member 135 is formed by bending an elongated bar-shaped member, the shape for biasing and retaining the front biasing member 135 can be simplified and the manufacturing cost can be reduced.

Since the through-hole 176 provided in the operation member 133 is positioned to face the release portion 140 at the cylindrical portion of the operation member 133, the release portion 140 can be pushed down using the release member 180 and the engagement between the release portion 139 and the inner protrusion 173 can be disengaged. This can facilitate the operation of removing the operation member 133 from the lever member 131.

(2) The upper support portion includes the front upper support portion (front upper protrusion 157) provided more to the front side than the turning center (shaft member 115) of the lever member 131, and the rear upper support portion (rear upper protrusion 158) provided between the turning center of the lever member 131 and the front upper support portion. The front biasing member 135 has the pair of left and right front acting portions 135a extending approximately parallel to each other. The pair of left and right front acting portions 135a are separately brought into contact with the operation member 133 at different positions with respect to the front-rear direction between the front upper support portion and the rear upper support portion and bias the operation member 133 upward. The retaining portion 139 and the release portion 140 are formed at one front acting portion 135a that comes into contact with the operation member 133 at a position which is close to the front upper support portion, at a position which is more forward than the front end of the other front acting portion 135a.

The pair of front acting portions 135a, the retaining portion 139, and the release portion 140 can be disposed compactly inside the cylindrical portion of the operation member 133 side by side in the vehicle front-rear direction, and the interference between the pair of front acting portions 135a during the vertical operation of the operation member 133 can be suppressed.

(3) The part inserted into the lever member 131 at the cylindrical portion of the operation member 133 is formed into a substantially semicircular cross section having the flat portion 170a at the upper portion, and the inner protrusion 173 of the operation member 133 is formed by causing a part of the flat portion 170a to protrude inward. The pair of left and right front acting portions 135a are disposed at the outer ends of the flat portion 170a in the left-right direction by means of the elastic forces of the front acting portions 135a.

Since the left-right direction positions of the pair of left and right front acting portions 135a of the front biasing member 135 are stabilized, the occurrence of abnormal noise and rattling caused by the displacement of the front biasing member 135 can be suppressed.

Since the cylindrical portion of the operation member 133 can be molded by pressing the tip of a cylindrical pipe member vertically, machining is easy and rigidity of the cylindrical portion can be enhanced.

(4) One front acting portion 135a has an approximate crank shape bent from one end to the other end of the flat portion 170a in the left-right direction. The part, of the one front acting portion 135a, extending in the left-right direction functions as the retaining portion 139, and the part, of the one front acting portion 135a, extending in the front-rear direction along the other end of the flat portion 170a functions as the release portion 140.

Since the front acting portion 135a can be molded by bending the bar-shaped member into an approximate crank shape, the front biasing member 135 including the front acting portion 135a can be easily formed.

(5) The release portion 140 is tilted to face inward in the left-right direction from the other end of the flat portion 170a in the left-right direction and extends to the front side to tilt downward. The through-hole 176 is formed at a position which is forward of the inner protrusion 173 of the flat portion 170a and is on the upper surface 169b1 or the lower surface 169b3 of the cylindrical portion of the operation member 133 so as to face the front end of the release portion 140.

By inserting the release member 180 into the inside of the cylindrical portion of the operation member 133 through the through-hole 176 and pushing the release portion 140, the release portion 140 can be pushed using the release member 180. Therefore, the engagement between the release portion 139 and the inner protrusion 173 can be easily disengaged, and the operation member 133 can be removed from the lever member 131.

(6) An inclined surface 174 inclined such that the retaining portion 139 can pass over the inner protrusion 173 when the operation member 133 is attached to the lever member 131 is formed at the rear portion of the inner protrusion 173. An engaging surface 175 is formed at the front portion of the inner protrusion 173 such that the operation member 133 is prevented from moving forward in a state in which the operation member 133 is attached to the lever member 131 and the retaining portion 139 and the inner protrusion 173 are engaged with each other.

The inner protrusion 173 is engaged with the release portion 139 of the front biasing member 135 to prevent the operation member 133 from moving to the front side (removal direction).

Further, when the operation member 133 is attached to the lever member 131, the inner protrusion 173 pushes down the retaining portion 139, and therefore the operation member 133 can be easily assembled to the lever member 131.

(7) At the lever member 131, the movement prevention protrusion 147d is formed, which is positioned on the rear side from the upper support portion and prevents the operation member 133 from moving to the rear side, the movement prevention protrusion 147d being formed by causing a part of the pair of left and right side walls 147 to protrude inward.

This can control the position of the operation member 133 relative to the lever member 131 in the vehicle front-rear direction together with the retaining portion 139 of the front biasing member 135.

Second Embodiment

Figure 17:
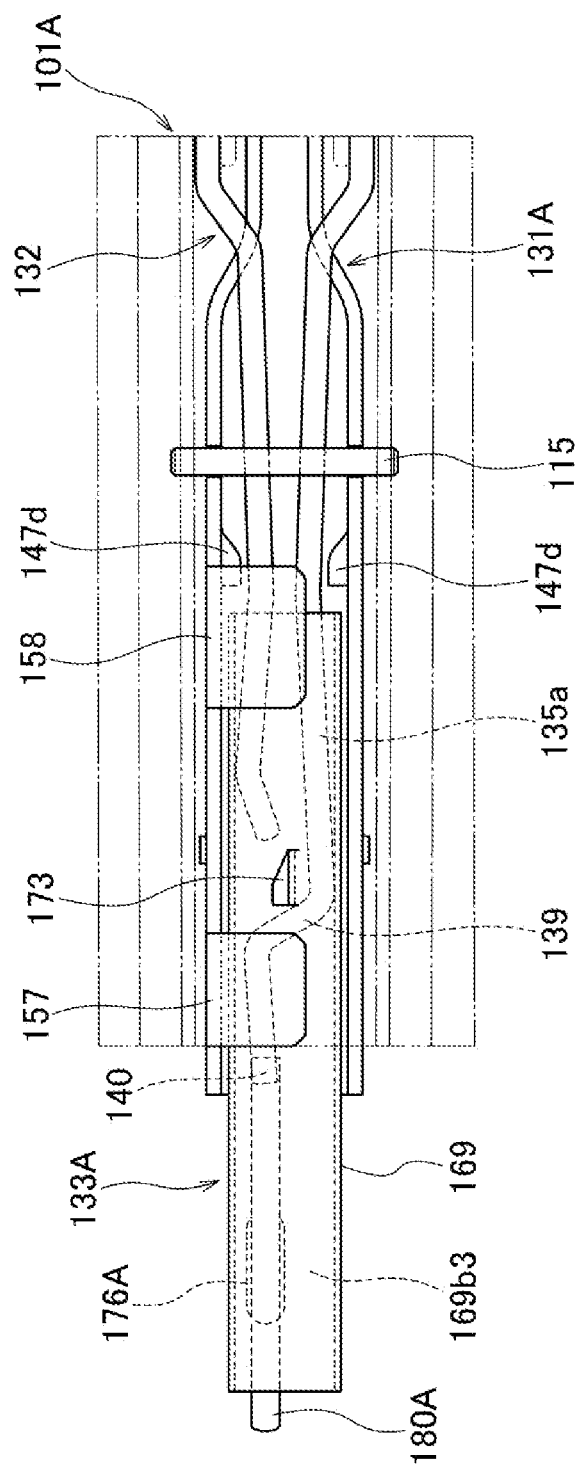
FIG. 17 is a plan view of a lever member and a biasing member of a seat sliding device according to a second embodiment of the present invention as viewed from above.
Figure 18:
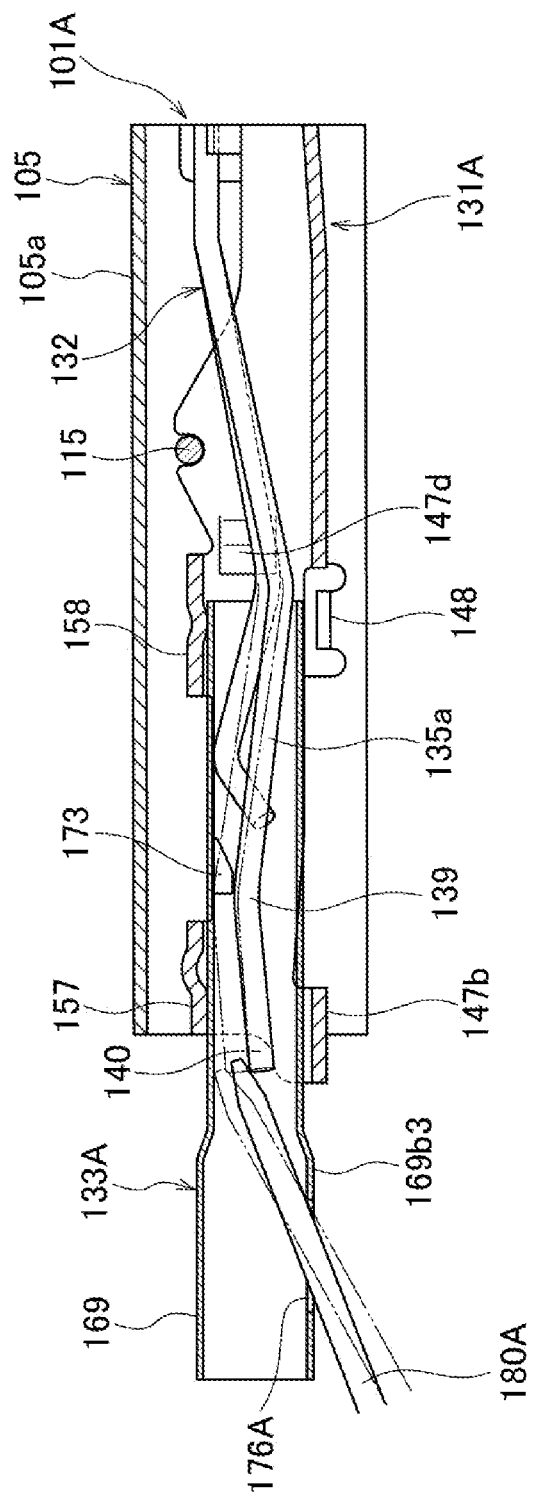
FIG. 18 is a side sectional view of an enlarged main portion of the seat sliding device according to the second embodiment of the present invention showing the state during the operation to remove an operation member.

FIGS. 17 and 18 show a seat sliding device 101A according to a second embodiment of the present invention.

Hereafter, the differences in shape, structure, and the like from the first embodiment will be mainly described.

As shown in FIGS. 17 and 18, a through-hole 176A that penetrates into the interior of a cylindrical portion of an operation member 133A is formed in a lower surface 169b3 of a part that is forward of a part inserted into the lever member 131, of the connection end 169 that is the cylindrical portion of the operation member 133A. Further, the through-hole 176A is formed at a position which is forward of the front end of the release portion 140 and is on the lower surface 169b3 of the connection end 169. The through-hole 176A is formed to a size that allows the insertion of a bar-shaped release member 180A from below (the lower surface 169b3), and in the present embodiment, the through-hole 176A is constituted by an elongated hole extending in the front-rear direction. The release member 180A is used to release the engagement between the retaining portion 139 and the inner protrusion 173, and may be a dedicated member for disengaging the aforementioned engagement or a tool such as a screwdriver.

In the present embodiment, the through-hole 176A is formed in the lower surface 169b3 of the connection end 169, but the through-hole 176A may be formed in the upper surface 169b1 of the connection end 169. In this case, the through-hole 176A is formed to a size that allows the insertion of the bar-shaped release member 180A from above (upper surface 169b1), and the shape of the release member 180A is set appropriately such that the release portion 140 can be pushed down from above.

Next, an example of an operation of removing the operation member 133A from the rail body 106 (lever member 131) will be described.

(Operation for Removing Operation Member 133A)

In the present embodiment, the operation member 133A is removed by pushing down the operation member 133A from below (lower surface 169b3) by means of the release member 180A. The release member 180A is inserted into the inside of the connection end 169 of the operation member 133 through the through-hole 176A, and the tip of the release member 180A is inserted between the release portion 140 and the upper surface 169b1 of the connection end 169. Then, by rotating the release member 180A with the edge of the through-hole 176A as a fulcrum, or by sliding the tip of the release member 180A rearward along the inner surface of the upper surface 169b1, the front end of the release portion 140 is pushed downward and the engagement between the retaining portion 139 and the engaging surface 175 of the inner protrusion 173 is disengaged.

The operational effects of the seat sliding device 101A according to the second embodiment will be described below. The operational effects common to those of the first embodiment described above will not be described.

(1) The through-hole 176A that penetrates into the interior of the cylindrical portion is formed at a position which is on the upper surface 169b1 or the lower surface 169b3 of the part that is forward of the part inserted into the lever member 131, of the cylindrical portion (connection end 169) of the operation member 133A, and is on the front side from the release portion 140.

Since the through-hole 176A provided in the operation member 133A is located at a position on the front side from the release portion 140 at the cylindrical portion of the operation member 133A, the release portion 140 can be pushed down using the release member 180A and the engagement between the release portion 139 and the inner protrusion 173 can be disengaged. This can facilitate the operation of removing the operation member 133A from the lever member 131.

(2) The through-hole 176A is formed at a position which is forward of the front end of the release portion 140 and is on the upper surface 169b1 or the lower surface 169b3 of the cylindrical portion of the operation member 133.

By inserting the release member 180A into the inside of the cylindrical portion of the operation member 133A through the through-hole 176A and pushing the release portion 140, the release portion 140 can be pushed using the release member 180A. Therefore, the engagement between the release portion 139 and the inner protrusion 173 can be easily disengaged, and the operation member 133A can be removed from the lever member 131A.

Although embodiments of the present invention have been described above, these embodiments are merely illustrative in order to facilitate understanding of the present invention, and the present invention is not limited to these embodiments. The technical scope of the present invention is not limited to the specific technical matters disclosed in the above embodiments, and also includes various modifications, changes, alternative techniques, and the like which can be readily derived therefrom.

For example, in the above embodiments, the length L1a between the support point P0 and the front acting point P1a on the other side (left side in the vehicle width direction) is almost the same as the length L2 between the support point P0 and the rear acting point P2 (L1a≈L2), but as similar to the one side (right side in the vehicle width direction), the length L1a may be shorter than the length L2 (L1a<L2). If the resultant force (F1a+F1b) of the front biasing force is greater than that of the rear biasing force F2 ((F1a+F1b) >F2), the length L1a may be made longer than the length L2.

The lower ends of the front end of the lever member 131 are connected to each other by means of the front lower wall 147b, but the lower ends may be shaped to be connected to each other by means of the front upper protrusion 157. In this case, the lever member 131 has an inverted U-shape with an open bottom, in which the lower wall 134 connecting the lower ends of the left and right side walls 147 to each other becomes the upper wall connecting the upper ends to each other.

What is claimed is:
1. A seat sliding device comprising:
a lower rail extending in a front-rear direction of a vehicle;
an upper rail that moves relative to the lower rail in a longitudinal direction;

a lever member that is turnably supported about an axis in a left-right direction with respect to the upper rail;

a lock member that is provided at a rear end of the lever member and includes a lock portion that can move between a lock position where the lock portion engages with a locked portion formed in the lower rail and a lock release position where the lock portion comes away from the locked portion;

a rear biasing member that biases the lock portion in a lock position direction; and an operation member connected to a front end of the lever member, wherein the lever member includes:

a pair of left and right side walls extending in a longitudinal direction of the upper rail;

an upper support portion that is provided at an upper end of a front end of at least one of the pair of left and right side walls and extends toward the other of the pair of left and right side walls in the left-right direction; and a lower support portion that is provided at a lower end of the front end of the at least one of the pair of left and right side walls and extends toward the other of the pair of left and right side walls in the left-right direction, the front end of the lever member is formed into a substantially square cross section by the pair of left and right side walls, the upper support portion, and the lower support portion, and a cylindrical portion of the operation member is inserted inside the front end of the lever member, a front biasing member is provided, which is formed of a bar-shaped member, and has a support portion engaged with an engaging portion provided in the upper rail and a front end inserted inside the cylindrical portion of the operation member, a retaining portion and a release portion are formed at the front end of the front biasing member, the retaining portion biasing the operation member upward and pressing the operation member against the upper support portion, and engaging with an inner protrusion provided at the operation member and preventing the operation member from moving forward, and the release portion extending forward from the retaining portion, and a through-hole that penetrates into an interior of the cylindrical portion of the operation member is formed in an upper surface or a lower surface of a part that is forward of a part inserted into the lever member, of the cylindrical portion of the operation member at a position facing the release portion or at a position on a front side from the release portion.

2. The seat sliding device according to claim 1, wherein the upper support portion includes a front upper support portion provided on a front side from a turning center of the lever member and a rear upper support portion provided between the turning center of the lever member and the front upper support portion, the front biasing member includes a pair of left and right front acting portions extending approximately parallel to each other, the pair of left and right front acting portions are separately brought into contact with the operation member at different positions with respect to the front-rear direction between the front upper support portion and the rear upper support portion and bias the operation member upward, and the retaining portion and the release portion are formed at one of the pair of left and right front acting portions that comes into contact with the operation member at a position which is close to the front upper support portion, at a position which is more forward than a front end of the other of the pair of left and right front acting portions.

3. The seat sliding device according to claim 2, wherein the part inserted into the lever member of the cylindrical portion of the operation member is formed into a substantially semicircular cross section having a flat portion on an upper portion, the inner protrusion of the operation member is formed by causing a part of the flat portion to protrude inward, and the pair of left and right front acting portions are disposed at outer ends of the flat portion in the left-right direction by means of an elastic force of each of the pair of left and right front acting portions.

4. The seat sliding device according to claim 3, wherein the one of the pair of left and right front acting portions has an approximate crank shape bent from one end to another end of the flat portion in the left-right direction, a part, of the one of the pair of left and right front acting portions, extending in the left-right direction functions as the retaining portion, and a part, of the one of the pair of left and right front acting portions, extending in the front-rear direction along the other end of the flat portion functions as the release portion.

5. The seat sliding device according to claim 4, wherein the release portion is tilted to face inward in the left-right direction from the other end of the flat portion in the left-right direction and extends to a front side to tilt downward, and the through-hole is formed at a position which is forward of the inner protrusion of the flat portion and is on the upper surface or the lower surface of the cylindrical portion of the operation member so as to face a front end of the release portion.

6. The seat sliding device according to claim 1, wherein the release portion is tilted to face inward in the left-right direction and extends to a front side to tilt downward, and the through-hole is formed at a position which is forward of a front end of the release portion and is on the upper surface or the lower surface of the cylindrical portion of the operation member.

7. The seat sliding device according to claim 1, wherein an inclined surface inclined such that the retaining portion can pass over the inner protrusion when the operation member is attached to the lever member is formed at a rear portion of the inner protrusion, and an engaging surface is formed at a front portion of the inner protrusion such that the operation member is prevented from moving forward in a state in which the operation member is attached to the lever member and the retaining portion and the inner protrusion are engaged with each other.

8. The seat sliding device according to claim 1, wherein a movement prevention protrusion is formed in the lever member, the movement prevention protrusion being positioned on a rear side from the upper support portion and preventing the operation member from moving to a rear side, and being formed by causing a part of the pair of left and right side walls to protrude inward.

* * * * *